Feb. 13, 1940.  E. E. KELLEMS  2,189,987
DEFORMATION CONTROL FOR RESILIENT BODIES AND THE LIKE
Filed April 29, 1937  2 Sheets-Sheet 1

Inventor
EDGAR E. KELLEMS
By Robert Cobb
Attorneys

Feb. 13, 1940.  E. E. KELLEMS  2,189,987
DEFORMATION CONTROL FOR RESILIENT BODIES AND THE LIKE
Filed April 29, 1937  2 Sheets-Sheet 2

Inventor
EDGAR E. KELLEMS
By Robert Cobb
Attorneys

Patented Feb. 13, 1940

2,189,987

UNITED STATES PATENT OFFICE 2,189,987

DEFORMATION CONTROL FOR RESILIENT BODIES AND THE LIKE

Edgar E. Kellems, Eugene, Oreg.

Application April 29, 1937, Serial No. 139,775

11 Claims. (Cl. 24—123)

This invention has to do with deformation controlling means for rubber or other resilient material, and more especially, to means for controlling the deformation of resilient gripping bodies and the like.

There are many uses to which the invention is applicable, such as, for example, electrical plugs by means of which various electrical appliances may be connected to conductors over which electrical energy is adapted to be transmitted; flexible pipe couplings; power driven sanding drums; expansion and contraction plugs; resilient engine mountings; motion transmitting instrumentalities; etc. Several different devices of the above mentioned group have been illustrated in the drawings of this application, and will be hereinafter more specifically described, by way of example, in order to afford a comprehensive explanation of the general principles of the invention. It is to be understood, however, that the invention is not limited to the particular fields exemplified by the various devices specifically shown and described herein, since the invention is of more general application and broad scope, and may be extended to various other applications.

In general, the invention involves the use of controlling means having the form of one or more flexible inelastic strands embodied in or united with a body of resilient material and arranged in such manner that when force is applied in one or more directions to the resilient material, the material is caused to be deformed in a predetermined manner in one or more directions. In addition, the control means or flexible strands above referred to also serve the purpose of reinforcing the resilient material with which the same are associated, but this reinforcement may be said to be of secondary importance in so far as the general idea is concerned.

The control means is preferably composed of a plurality of strands of suitable inelastic material, such as metal, fiber, cotton, or the like, arranged in one or more layers, with or without interweaving the strands together, the strands being preferably spirally disposed about the axis of the resilient body so as to lie at an angle to the axis. If desired, the angle of inclination of the strands may be varied in the different layers or at intervals along the axis in one or more layers, and may range from zero degrees to substantially plus and/or minus ninety degrees respecting the axis. The variation of the angular disposition of the strands may be utilized to produce a predetermined deformation of the resilient body which may be calculated in advance according to the desired result to be obtained, as will hereinafter more fully appear.

In some cases, it may be desired that the so-called control strands be interwoven or braided together, in which case, I prefer an open mesh or loose weave rather than a closed or tight weave, although the latter may be satisfactory for some applications. As previously mentioned, it is not necessary to weave or braid the control strands, since the same can be arranged in one or more layers of parallel strands, the strands being preferably uniformly spaced circumferentially about the axis of the resilient body, the deformation of which is to be controlled by the strands.

It is an object of the invention to provide a simple and inexpensive control means for resilient bodies which is capable of producing a powerful control force upon the resilient material in one or more directions, incident to the application of force to the resilient material of the body, the arrangement being such that the control force is preferably distributed evenly to the resilient body. This is particularly important in the case of gripping bodies in that it protects the member being gripped from injury by minimizing localized stresses thereon.

Other and further objects and advantages of the invention will be hereinafter described, and the novel features thereof defined by the appended claims.

In the drawings.

Like reference characters designate corresponding parts in the several figures of the drawings.

Figure 1:
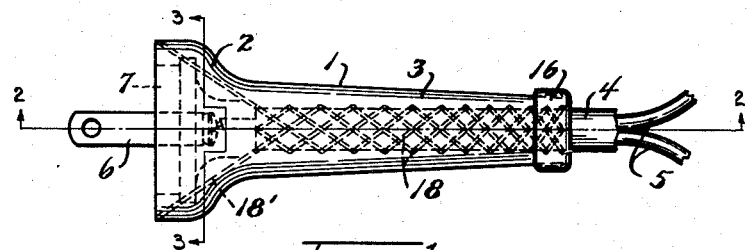
Figure 1 is a view in side elevation of an electric plug connector device illustrating one form of my invention as applied to produce a firm gripping action of the plug body upon the electrical conductors to prevent relative movement between the conductors and the plug body when in use.
Figure 2:
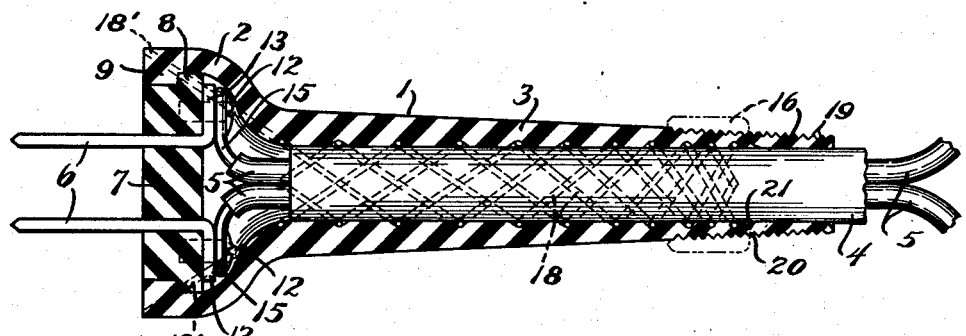
Figure 2 is an enlarged sectional view, taken approximately on the line 2—2 of Figure 1, the conductors and the terminal prongs with which the same are connected being shown in elevation.
Figure 3:
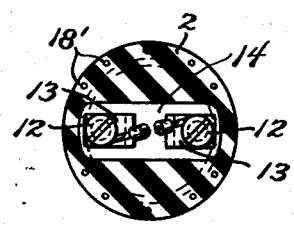
Figure 3 is a transverse sectional view, taken approximately on the line 3—3 of Figure 1.

Referring first to the electrical connector plug device of Figures 1 to 4 inclusive, I generally designates the plug body which is preferably composed of soft rubber molded or otherwise formed to provide an enlarged cup-shaped head portion 2 and an elongated tubular sleeve portion 3, preferably forming an integral continuation of the head portion 2. As will be readily understood from reference to the drawings, the sleeve 3 is hollow, and is adapted to receive therein an electric cable, generally designated 4, composed of one or more electrical conductors 5 which are adapted to be connected in the usual manner with terminal prongs 6, there usually being two conductors 5 and a corresponding number of terminal prongs 6 in a device of this kind. The terminal prongs 6 are shown to be molded in a disc-like body 7 which is provided with an annular flange 8, the prongs and body 7 constituting an insert adapted to be mounted in the head portion 2 of the plug body I, as will be best understood from reference to Figures 1 and 2. The head 2 is provided with a thickened lip 9, forming an annular flange 10 interiorly of the same behind which the flange 8 of the insert body 7 is adapted to be forced so as to provide a positive interlock between the insert 7 and the head 2 when the insert is forced or pressed into the head, as shown in Figure 2. When the insert 7 and plug body I have been assembled as just described, the flange 8 on the plug 7 is received in the annular recess or groove 11 within the head 2, and the insert is closely embraced by the wall of the head, and relative axial movement between the parts is thereby prevented. Of course, it is to be understood that the head 2, being made of rubber, may be expanded sufficiently to allow the insert 7 to be mounted in or removed from the head at will. The conductors 5 are adapted to be connected to the terminals or prongs 6 by means of the usual connector screws 12, which have threaded engagement with and extend through the laterally offset inner ends 13 of the prongs, these offset ends preferably lying closely adjacent to the rear face of the insert 7. At the rear side of the insert 7, the head 2 of the plug body I is formed to provide a recess 14, as best seen in Figure 3, in which the laterally offset ends 13 of the terminal prongs 6, and the connector screws 12, together with the extremities 15 of the conductors 5 which are engaged by the screws 12, lie. This recess 14 serves to prevent the insert 7 from shifting rotatably within the head 2 after the same is mounted therein, thus preventing the conductors 5 from becoming twisted during use.

The tubular or sleeve-like section 3 of the plug body I is preferably formed so that its axial bore is slightly larger than the electric cord or cable 4 so as to be normally capable of being slid onto and off of the cord 4 for convenience of assembly and disassembly of the plug body with the cord. It will be observed that the wall of the sleeve section 3 of the body I tapers gradually thinner from the head 2 towards the opposite end, and terminates in the form of a relatively thin ring-like extension 16 which normally is disposed in a position constituting a continuation of the sleeve 3, as shown in full lines in Figures 2 and 4. This ring-like extension 16 is preferably flared, as at 17, to facilitate the entrance of the cord or cable 4 into the ring 16. The cord or cable is slipped through the plug body I, through which it is preferably freely movable, following which the terminal ends 15 of the conductors 5 are attached to the terminals or prongs 6 by means of the screws 12. The insert 7 may then be pressed into the head 2 of the plug body I, thereby firmly interlocking the separable parts of the plug device together. Means is preferably provided for relieving the cable or cord 4 from strains tending to cause the conductors 5 to pull away from the terminals 6 or break off at their terminal attached ends, and to this end, I preferably provide means for producing an initial gripping or snubbing action of the plug body upon the cord or cable 4. Such means will now be more particularly described.

As shown in Figures 1 to 4 inclusive, I provide a plurality of inelastic non-conductive flexible strands, generally designated 18, which are united with the plug body, as by vulcanizing the same to the inner face of the sleeve-like section 3. These strands, as shown, extend spirally around the axis of the sleeve 3 from a point adjacent to the head 2 to a point near the ring-like extremity 16 at the opposite end of the sleeve. The strands may be composed of string, fiber, or any other suitable material. Non-conductive strands are preferred for electrical plug devices of this sort above described, since they minimize the likelihood of short circuits or accidental grounding of the conductors 5, but it is to be understood that the non-conductive characteristic of the strands 18 is not absolutely essential. For example, resilient or non-resilient metal wires might be substituted for the string or cord strands 18, if desired, but would not be as safe as non-conductive strands in devices of this kind. On the other hand, the control strands may be elastic or springy to bending but inelastic to tension where the gripping devices are used out in the weather, as the rubber will deteriorate and lose its elasticity in time and the device will then have to depend on the springiness of the control to produce and maintain the initial gripping or snubbing action. There are many other places where it will be necessary to have the control springy. As shown in the drawings, the strands 18 are loosely interwoven in the form of an open mesh tube, but here again I do not wish to be limited to the interweaving of the strands or to their open mesh relation. I have found, however, that the arrangement as shown in the drawings is eminently suited for the intended purposes, and that by saturating the strands 18 with rubber and vulcanizing them to the plug body I during or after the molding of the body, a firm and positive union is established between the strands and the plug body. On the other hand, the strands 18 may be incorporated in the plug body during molding of the same so that they lie intermediate the inner and outer surfaces thereof. Also, instead of vulcanizing the strands to the inner surface of the plug body as shown in Figures 1 to 4, they may be applied to the outer surface. One convenient way of making the plug devices or gripping bodies such as have been shown in Figures 1 to 4 is to hold the strands 18 on a core while molding the rubber around it, the rubber mold being preferably designed so that when it is forced together the rubber flows from the large end to the small end of the tube, thereby tightening the woven strands on the core. Other and perhaps more convenient ways of making the gripping bodies may be worked out, and will readily present themselves to those skilled in the art. The strands 18 may, if desired, be extended, as at 18', to the extreme end of the plug body 1, which is to say that the strands may be extended through the head 2, in which case, they are preferably brought straight through rather than spirally. As will be best seen from reference to Figure 3, the strands 18' in the head 2 are preferably arranged within the head at equally spaced distances apart, circumferentially.

If desired, the angle of inclination of the strands 18 respecting the axis of the plug body 1 may vary at different points in the length of the body. As shown in Figures 1 to 4, the angles of the strands at the head end of the sleeve 3 are smaller, and gradually increase as the strands progress towards the opposite end of the sleeve. This variation in the angle of the strands is not absolutely essential, although I have found the same to be preferable and quite desirable under some circumstances. Assuming the strands to be arranged as shown in Figures 1 to 4, then, after assembly of the plug parts with the conductors 5, as previously described, the ring like extremity 16 is rolled outwardly and over the end of the sleeve 3, as shown in broken lines in Figure 2, and in full lines in Figure 1. This contracts the end of the sleeve, and produces an initial clamping action on the cable or cord 4 at the end of the sleeve. As a result of this initial clamping action just referred to, a snubbing action of the control strands 18 is produced, preventing relative axial movement between the cable or cord 4 and the sleeve 3. For example, if force is applied to the cord 4 in a direction tending to pull the cord out of the open end of the sleeve 3, the close frictional engagement of the end of the sleeve, resulting from the constriction of the sleeve by the rolled-over, ring-like extremity 16 starts the control strands 18 to contract inwardly, thereby producing a powerful gripping action upon the cord 4 throughout the full length of the sleeve 3 of the plug body 1 within which the cord is disposed. It will thus be seen that a distortion or deformation of the sleeve 3 in the nature of a longitudinal expansion will cause the strands 18 to change their angular positions respecting the axis of the sleeve in such manner as to automatically produce a radial contraction of the strands, and consequently a radial contraction of the sleeve, it being understood that the strands 18 are inelastic and are united to the sleeve. The greater the force or pull exerted upon the cable 4, or upon the sleeve 3, tending to place the strands 18 under tension, the greater the gripping action exerted by the sleeve and strands upon the cable. When the strands 18 are extended, as at 18', through the head 2, as shown in the drawings, there is also produced a gripping action upon the insert 7 responsive to the application of force to the plug body 1 in a direction tending to longitudinally extend the body. Since the extended strand ends 18' are preferably practically straight, and have little or no spiral, there will be very little longitudinal extension of the main body of the plug 1. However, the cord or cable 4 will be firmly held in fixed relation to the terminals 6 even when the cord 4 and sleeve 3 are arcuately deformed or bent laterally on an arc having a very small radius of curvature. In such a case, certain of the stands 18 will be deformed so as to be placed under compression, whereas certain others of the strands 18 will be placed under tension, and these latter strands will be deformed so that their angles respecting the axis of the plug body will change and produce a powerful gripping action which will be distributed throughout the length of the plug body.

Experience has shown that the control strands 18 have greater holding power when they are affixed to or embedded in the inner face of the tubular section 3 of the plug body 1, or molded in the tubular section relatively close to the inner face thereof, as it takes less longitudinal movement of the strands to produce a firm gripping action upon the cord 4. This also gives a slightly higher localized stress between the control strands 18 and the cord, but the rubber prevents the localized stress from injuring or damaging the cord.

As previously mentioned, the end of the tubular section 3 opposite to the head 2 is preferably thinner than the other end. This makes the tubular section 3 more flexible where the longitudinal force is less, and the end may be more readily contracted by the ring-like extremity 16 when it is rolled over into its broken line position shown in Figure 2. The wall of the tubular section 3 is preferably designed to vary in thickness so that when the tube and cord 4 are deformed into an arc, the radii of curvature are constant along the arc of the cord. The angle at which the strands 18 are arranged respecting the axis of the tubular section 3 will also have an effect upon the flexibility of the section 3. Large angles will make the section more flexible, whereas small angles will make the section more rigid. It will readily be seen that if the strands 18 are disposed at zero degrees, which is to say that the strands are parallel with the axis of the tubular section 3, there would be no gripping action, but there would be a reinforcing action, causing the tube to be more rigid as far as bending is concerned. While the angles of the strands 18 shown in the drawings vary from relatively small angles at the head end of the tubular section 3, to relatively large angles at the opposite end, it is to be understood that I do not wish to be limited to the provision of varied angles, as the strands may be arranged at the same angles respecting the axis of the plug body, throughout the length of the body, if this is preferred. A uniform angular arrangement of the strands 18 will produce a satisfactory powerful gripping action, although variation in the angular arrangement will sometimes be better, depending upon the type of service encountered in the use of the gripping body.

Figure 4:
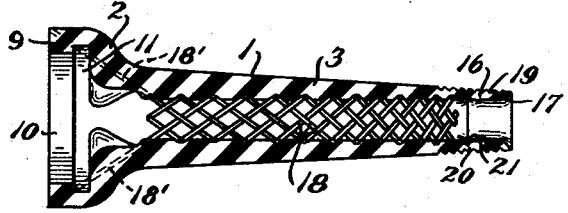
Figure 4 is a sectional view generally similar to Figure 2, showing the plug body and its associated control strands as a new article of manufacture, the same being in its form preparatory to assembly with the electrical conductors and terminal members.

As best seen in Figures 2 and 4, the outer face of the end of the tubular section 3 opposite to the head end, and the outer wall of the ring-like extremity 16, are each preferably serrated or corrugated, as at 19, so that when the ring 16 is rolled back over the tubular section, as shown in full lines in Figure 1 or in broken lines in Figure 2, it will more readily tend to remain in this rolled-over position by reason of the interengagement of the serrations or roughened surfaces which tend to establish a greater friction between the contiguous surfaces. The rolling of the ring 16 over the end of the tubular section 3 may be accomplished more easily if the outer surfaces of the ring 16 and the tube 3 are wet.

To further facilitate the rolling action of the ring 16 as previously described, the juncture of the ring 16 with the tubular section 3 is made relatively thin, as at 20. This can be attained by forming an annular substantially V-shaped recess or groove 21 in the inner wall of the plug body 1 at the juncture between the end of the tubular section 3 and the ring 16, during the molding of the rubber.

The manner of assembly of the plug parts and the cable or cord 4 has already been described, and it will be readily understood that detachment of the cord 4 from the plug can be accomplished by following the reverse of the assembly procedure. In other words, to effect a detachment of the cord 4, the ring 16 is rolled off of the end of the tubular section 3 until it assumes its normal coaxial extended position, as shown in full lines in Figures 2 and 4. When the ring 16 is so disposed, the cord 4 is relieved from the gripping action initially imposed upon the same by the constricting pressure exerted by the ring while it is rolled back over the tubular section 3, and the cord is now free to move longitudinally within the plug body. The insert 7 may now be removed from the head 2 by suitably deforming or expanding the head 2 to disengage the flange 8 from behind the lip 10, after which the insert may be moved away from the head 2 while the conductors 5 remain attached to the terminal 6 by the screws 12, such movement being permitted by reason of the fact that the cable or cord 4 is now free to move through the body of the plug. After drawing enough of the cord 4 through the plug body to afford access to the terminal screws 12, the screws 12 may be loosened to disconnect the conductors 5 from the terminals 6.

It is to be understood that I do not wish to be limited to the use of a plug body having an axial bore larger than the cable or cord 4, as previously described. Such a construction is preferred, however, because of the fact that assembly and disassembly of the cord and plug parts is greatly facilitated. On the other hand, the axial bore of the plug body may, if desired, be made the same size or slightly smaller than the cable or cord 4, in which case, the rollable ring-like extremity 16 may be eliminated entirely. In such a case, where the ring 16 is omitted, the initial gripping or snubbing action required to make the control strands 18 effective for the purposes intended, is attained by the close frictional engagement between the tubular section 3 of the plug body and the cord or cable 4. Otherwise, the action of the control strands 18 is substantially the same.

Figure 6:
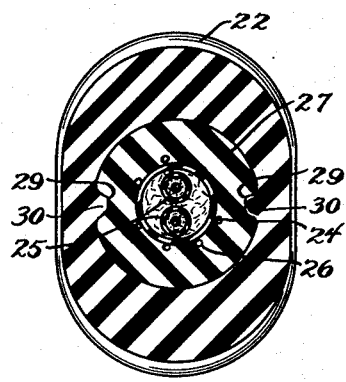
Figure 6 is a sectional view, taken approximately on the line 6—6 of Figure 5.
Figure 5:
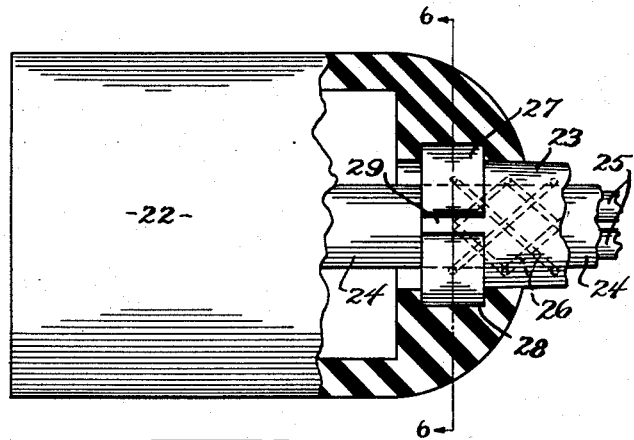
Figure 5 is an enlarged fragmentary view, partly in section and partly in elevation, of a modified form of connector plug having my invention embodied therein.

Referring now to Figures 5 and 6, I have shown my invention applied to an electrical connector plug of a slightly different type from that illustrated in Figures 1 to 4 inclusive. In other words, the device of Figures 1 to 4 is a male type of plug, whereas that of Figures 5 and 6 is a female type of plug which is especially adapted for use in connecting an extension cable or cord to electric irons, toasters and similar appliances provided with the usual male terminals or prongs thereon. In the case of the modified construction shown in Figures 5 and 6, the head 22, which is formed of rubber or other suitable insulating material, is preferably made separately from the cord embracing gripping body 23. The cord or cable is designated 24, and includes one or more (preferably two) conductors 25. It will be understood that the conductors 25 are adapted to be connected with suitable terminals (not shown) mounted within the head 22.

The gripping body 23 is preferably composed of rubber, and is generally similar in construction to the tubular sleeve-like section 3 shown in Figures 1 to 4. The control strands are generally designated 26, and may be arranged in a manner similar to the control strands 18 shown in Figures 1 to 4. As previously described, the control strands 26 may be vulcanized to or otherwise united with the inner face of the tubular body 23, or they may be applied to the outer face of the body, or incorporated in the body itself during the molding thereof, so as to lie intermediate the inner and outer faces of the body. The strands 26 are preferably spirally disposed about the axis of the body 23 so as to form uniform or varying angles relative to the axis along the length of the body. Instead of arranging the control strands 26 in a single layer as shown, they may be divided into a plurality of layers, with the strands of each layer forming the same or different plus and/or minus angles with the axis of the body, as preferred.

The tubular body 23 is preferably made slightly larger than the cord or cable 24 so as to be freely slidable onto and off of the same in the assembly or disassembly of the plug with the cord, in which case, the extremity of the body 23, opposite to the head end 22 will be preferably provided with a flexible ring-like extension, generally similar to that shown in Figures 1 to 4 inclusive, this extension being adapted to be rolled back over the end of the body 23, after assembly of the parts, to contract the same about the cable or cord 24, and impart an initial gripping or snubbing action to the body 23. This initial contraction or snubbing action just referred to is availed of to render the control strands 26 effective to produce a powerful gripping action of the body 23 upon the cord or cable 24, responsive to the application of force tending to axially extend the body 23, or any portion thereof. The gripping action will accordingly be uniformly distributed throughout the length of the body 23.

By making the body 23 the same size as or slightly smaller than the cord or cable 24, so as to produce a close frictional contact between the body and the cord when the cord is slipped into the body, the rollable contracting ring at the end of the body opposite to the head 22, may be dispensed with entirely if desired.

The tubular body 23 is preferably removably attached to the head 22 by means of an enlarged head or annular ring 27 which is preferably integrally formed with the tubular body 23 at the end thereof, as shown in Figures 5 and 6. This ring projects radially outwardly from the tubular body 23, and is adapted to be received in an annular groove or recess 28 formed in the end of the plug 22. In order to prevent the body 23 from rotating relatively to the head 22, the ring 27 is provided with one or more (preferably two) longitudinal grooves or recesses 29, within which complemental ribs 30 formed on the inner face of the groove 28 in the head 22 are adapted to be received, as best seen in Figure 6. Thus, twisting of the conductors 25 through relative rotation between the body 23 and the head 22 is positively prevented, and undesirable strains upon the conductors, tending to break the same or pull the same loose from the terminals (not shown), are eliminated. The control strands 26 may be dead-ended in the ring 27, and the action of these strands is the same as in the case of the strands 18 of Figures 1 to 4, thus producing a firm gripping action of the tubular body 23 upon the cable or cord 24, responsive to the application of force to the cord or to the body 23 itself, more especially, responsive to force tending to pull the cord out of the head 22, or to bending of the cord near the head 22.

Considering the application of my invention to pipe couplings and the like, reference will now be made to Figure 7, wherein 31 generally designates an elongated tubular body or sleeve which is preferably composed of rubber or other suitable resilient flexible material. The tubular body is preferably formed slightly larger than the size of the pipes to which the same is to be applied, in which case, the same can be freely applied over the ends of the pipes 32 and 33, which are to be coupled together. Intermediate the opposite ends of the body 31, I preferably provide one or more annular stop flanges 34 which project radially inwardly from the inner face of the tube and serve to limit the relative longitudinal movement between the body 31 and the pipes 32 and 33 in mounting the coupling on the pipes. In the fully assembled condition, the pipes are inserted into the opposite ends of the tubular body 31, bringing the ends of the pipes 32 and 33 respectively into abutting engagement with the flanges 34, thereby centering the coupling so that the same will embrace substantially equal lengths of the pipe ends. Annular fins 35, 36, 37 and 38 are preferably provided on the inner face of the tubular body 31, and project radially inwardly from the inner face thereof, these fins being flexible and of somewhat smaller internal diameter than the external diameter of the pipes so that when the pipes are inserted into the coupling body, the fins will grip the pipes firmly. At least two fins 35 and 38 are provided, the same being arranged adjacent to the opposite ends of the coupling body 31. The fins 36 and 37 which are arranged intermediate the ends of the coupling body 31 are optional, and may or may not be used, as desired. Normally, the fins project within the tubular body 31 substantially perpendicularly to the axis thereof, as illustrated in the right half of the view Figure 7, wherein the pipe 33 is shown in full line in a position prior to insertion of the same into the end of the tubular body 31. When the pipe 33 is fully inserted in the body 31 to the broken line position illustrated in the right half of Figure 7, which is the coupled position, it corresponds to the coupled position of the pipe 32 which is shown in its fully inserted coupled position in the left half of Figure 7. It will be observed that the fins previously referred to will flex and assume a distorted position closely embracing the pipes when the pipes are inserted in the body 31, as will be best understood from reference to the lefthand portion of Figure 7.

Embodied within the tubular body 31, are a plurality of control strands, generally designated 39, which are similar to the control strands 18 and 26 of Figures 1 to 4, and 5 and 6, respectively. As previously mentioned in connection with the control strands 18 and 26, the control strands 39 may be affixed to the inner or the outer face of the tubular body 31, or they may be embodied within the tubular body 31 so as to lie intermediate the inner and outer faces thereof, as more particularly shown in Figure 7. The strands are shown in Figure 7 disposed in a single layer, and are interwoven together so as to lie at varying angles respecting the axis of the tubular body 31, but it is to be understood that the arrangement may be modified so that the strands are arranged in more than one layer, with or without interweaving the same together in each layer, and/or at uniform or varying angles respecting the axis, as preferred. According to the construction illustrated in Figure 7, the strands 39 form relatively large angles respecting the axis of the tubular body 31 at the opposite ends of the body, which angles progressively decrease towards the center of the body. Such an arrangement is particularly well suited in the application of my invention to pipe couplings as the same affords a very efficient control of the deformation of the rubber to produce a powerful gripping action upon the pipes.

The gripping action of the coupling body 31 and associated control strands 39 is substantially the same as previously described in connection with the electrical connector plug devices shown in Figures 1 to 6. For example, assuming that the pipes 32 and 33 serve to conduct fluid therethrough under pressure, then the fluid pressure will tend to displace the pipes longitudinally away from each other, thus tending to produce a corresponding longitudinal extension of the tubular body 31. However, since the fins 35, 36, 37 and 38 serve to initially grip the pipes 32 and 33, the effect thereof is to impart a snubbing action to the control strands 39, with the result that any tendency of the tubular body 31 to extend longitudinally will cause the control strands to contract radially inwardly, and to thus exert a radial contraction of the tubular body 31 which is substantially uniformly distributed throughout the length of the coupling body. The greater the internal fluid pressure or external force tending to displace the pipes 32 and 33 longitudinally, the greater will be the gripping action exerted upon the pipes by the coupling body 31. The stop flanges 34, against which the pipes 32 and 33 are adapted to abut, and the fins 35, 36, 37 and 38 effectively serve to prevent escape of the fluid which is being conducted through the pipes, as will be perfectly obvious from Figure 7. Moreover, the internal pressure in the pipes 32 and 33 will act upon the fins 35, 36, 37 and 38, if there should be any leakage of the fluid between the extreme ends of the pipes and their coacting stop flanges 34, to force the fins into tighter engagement with the pipes, since the action of the pressure upon the fins is in a direction tending to flex the fins radially inwardly from their distorted positions which they assume when the pipes are inserted into the coupling body 31.

Figure 7:
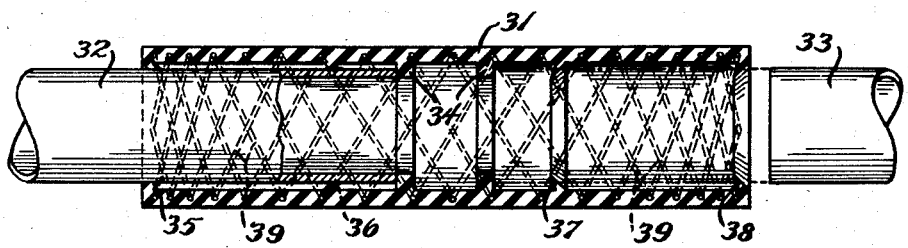
Figure 7 is a longitudinal sectional view of a pipe coupling constructed in accordance with my invention, and illustrating the manner of use thereof in connecting the ends of two pipes together.

Instead of providing two stop flanges 34, spaced axially apart, as shown in Figure 7, a single centrally disposed flange may be used, but I prefer the arrangement as shown in Figure 7 since it enables the central part of the tubular body 31 to be bent to accommodate pipes to be connected together, but which are not exactly in alignment. With sufficient space afforded intermediate the two stop flanges 34, the tubular body 31 may be bent so that it can be used to connect pipes which are disposed at right angles to each other, or at any other substantial angle.

When the arrangement of the control strands 39 has been correctly designed, there will be no appreciable movement of either of the pipes 32 and 33 when there is a change in the internal fluid pressure, since the expansion or contraction of the tubular body 31 at the central portion intermediate the stop flanges 34 will cause the tube to correspondingly contract or expand longitudinally at this portion, according to whether the pressure change is in the nature of an increase or a decrease. Moreover, the longitudinal extension or contraction of the mid-portion of the connector body will be equal to the longitudinal contraction or extension, respectively, of the end portions of the connector body. Longitudinal contraction of the end portions of the connector body will tend to force the ends of the pipes against the stop flanges 34, thus aiding to seal the connector and pipe against leakage.

Instead of making the tubular connector body 31 larger than the pipes 32 and 33, it may be made the same size as or slightly smaller than the pipes so as to fit thereon with a close frictional fit, this tight fit being relied upon to start the control action of the strands 39 in producing the gripping effect ascribed to these strands. In such a case, the annular fins 35, 36, 37 and 38 may be dispensed with entirely. However, the arrangement illustrated in Figure 7 is perhaps more satisfactory than the modification just referred to, inasmuch as it enables the coupling body to be applied to or removed from the pipes 32 and 33 with greater facility, and otherwise improves the efficiency of the action of the control strands 39 for the purposes which these strands serve.

The foregoing description, taken in conjunction with the drawings, should suffice to explain the general principles of my invention, and for this reason, it is believed unnecessary to include herein further explanations of additional applications of the invention.

While the specific details have been shown and described, the invention is not confined thereto as changes and alterations may be made without departing from the spirit thereof as defined by the appended claims.

Having thus described my invention, what I claim as new and desire to secure by Letters Patent is—

1. As a new article of manufacture, a tubular body composed of rubber or the like, means united with the rubber for causing the tubular body to deform in a direction to produce a gripping action upon the object to be gripped, responsive to the application of force in one or more directions to the tubular body, and means for establishing an initial gripping action of the tubular body upon the object to be gripped, said last named means comprising at least one annular fin arranged interiorly of the tubular body and projecting radially inwardly thereof for a distance sufficient to closely embrace the object to be gripped with a firm frictional contact.

2. In combination, an electrical attaching plug and cord, contact means carried by said attaching plug and adapted to make contact with an outlet, means to electrically connect the cord with said contact means, said attaching plug including a tubular sleeve having a body portion comprising a resilient material deformable in the direction of the length of the sleeve, a plurality of flexible but inelastic filaments permanently associated with said resilient body portion, and being spirally disposed in opposite directions about the axis of such body portion so as to form an open meshed structure; the cord being of such size as to permit the same to be slid, with the outer surface of the cord and the surface of the bore of the tubular sleeve in surface contact, through said bore and toward said connecting means, said sleeve, when a pulling action is applied to the cord, away from said outlet, tending to stretch and said filaments under such pull, being adapted to change their position with respect to the axis of the bore so as to reduce the diameter of such open meshed structure and thereby cause a positive contraction of said sleeve such as to firmly engage the inside of the sleeve with the outer surface of the cord, and grip the attaching plug in secure and non-sliding engagement with the cord.

3. The combination as set forth in claim 8, wherein the filaments engage the surface of the portion of the article disposed in said sleeve and constitute the sole attaching means between the article and the sleeve.

4. The combination as set forth in claim 8, wherein the filaments form with said axis of the sleeve angles varying along the sleeve.

5. The combination as set forth in claim 8, wherein the filaments form with said axis of the sleeve angles varying along the sleeve, the angles which the filaments form with the axis aforesaid being greater at one end of the sleeve.

6. The combination as set forth in claim 8, wherein the filaments form with said axis of the sleeve angles varying along the sleeve, the angles which the filaments form with the axis aforesaid being greater at both ends of the sleeve than at points intermediate the ends thereof.

7. In a device adapted to be secured by a gripping action to an article, a tubular gripping body formed to contain the portion of the article to be gripped with interior surfaces thereof in surface contact with such portion of the article and comprising a plurality of flexible inelastic strands disposed about a common axis in open meshed relation so that the body is free to expand radially when stressed in one direction and free to contract radially when stressed in another direction, and an elastic material affixed to said strands so as to be correspondingly deformed radially responsive to the expansion and contraction of the strands as aforesaid, whereby said tubular body is enabled to be moved relative to the article in one direction to slidably receive the same and to resist movement relative the article in the opposite direction, said inelastic strands in said last mentioned case being operative to positively contract the elastic material about the article to attach the body more firmly to the article and said elastic material being operable when the stresses tending to separate the body from the article have ceased, to restore said open mesh structure to its normal condition on the article.

8. For combination with an article, a device including a sleeve composed of elastic material so as to be deformable under stress and having normal interior dimensions such as to enable it to slidably receive the portion of the article disposed within the sleeve with its interior surfaces in surface contact with such portion of the article, a plurality of flexible but inelastic filaments permanently united to the elastic material of said sleeve and being spirally disposed in opposite directions about the axis of such sleeve so as to form an open meshed structure, said sleeve and filaments being arranged to normally provide a close frictional engagement between the device and the enclosed portion of the article with the said inelastic filaments in an at-rest condition and said filaments being adapted when a longitudinal force in one direction is applied to said device, to change their angular positions with respect to the axis of said sleeve so as to reduce the diameter of such open meshed structure and thereby cause a positive contraction of said elastic sleeve from its normal condition on the article such as to firmly attach the device to the article, the inelastic filaments maintaining such gripping action until a cessation of the longitudinal force enables the elastic material of said sleeve to resume its normal condition on the article and thereby restore such filaments to their at-rest condition.

9. A device adapted to be secured by a gripping action to an article, comprising a tubular member composed of elastic material so as to be deformable under stress and having a normal interior diameter such as to enable it to slidably receive the portion of the article to be gripped with its interior surfaces in surface contact with such portions of the article, a plurality of filaments permanently united to said tubular member, said filaments being flexible but inelastic and being spirally disposed about the axis of such member, a portion of such filaments spiralling about such axis in a direction opposite to the remaining portion thereof and all of the filaments being in spaced relation so as to form an open meshed structure, the flexible but inelastic filaments of such structure being arranged to enable the portion of filaments spiralling in one direction to change their angular positions with respect to the portion thereof spiralling in the opposite direction when longitudinal force is applied to the device so as to reduce the diameter of such open meshed structure and thereby cause a positive contraction of the tubular member from its normal condition, whereby the portion of an article positioned in such tubular member is firmly gripped against sliding movement relative thereto, the inelastic filaments being adapted to maintain the tubular member in contracted condition until a cessation of such longitudinal force enables the elastic material of said tubular member to resume its normal condition and thereby restore the normal angular relation of said filaments.

10. A device adapted to be secured by a gripping action to an article, comprising a tubular member composed of elastic material so as to be deformable under stress and having normal interior dimensions such as to enable it to slidably receive the portion of the article to be gripped with its interior surfaces in surface contact with such portion of the article, a plurality of flexible but inelastic filaments permanently united to said member and being spirally disposed in opposite directions about the longitudinal center line of said member so as to form an open meshed structure, said filaments being arranged to enable them to change their angular positions with respect to said center line when a longitudinal force is applied to said device so as to reduce the diameter of such open meshed structure and thereby cause a positive contraction of said tubular member from its normal condition, whereby the portion of an article positioned in said tubular member is firmly gripped against sliding movement relative thereto, said tubular member being formed to provide an annular portion thereof capable of embracing such portion of the article more tightly than the remaining portion thereof and adapted on the application of such longitudinal force to cause an initial immediate contraction of said open meshed structure in the neighborhood of such annular portion, the inelastic filaments of said open meshed structure being adapted to maintain said tubular member in contracted condition until a cessation of the longitudinal force enables the elastic material of said member to resume its normal condition and thereby restore such filaments to their normal angular positions with respect to said center line.

11. A device adapted to be secured by a gripping action to an article, comprising a tubular member of resilient material having normal interior dimensions to enable it to snugly and slidably receive the portion of the article to be gripped, a plurality of flexible but inelastic filaments permanently united to said member and being spirally disposed in opposite directions about the center line of said member so as to form an open meshed structure, said inelastic filaments being arranged to enable them to change their angular positions with respect to said center line, when strain is applied to said member in a direction tending to extend the same longitudinally, so as to resist longitudinal extension of said tubular member and to positively contract the same from its normal condition, whereby a portion of an article positioned in said tubular member is firmly gripped to prevent displacement of the same from such member.

EDGAR E. KELLEMS.